F. WOODARD & W. J. KAMP.
WAGON RACK BRACKET.
APPLICATION FILED FEB. 24, 1915.
1,171,684.
Patented Feb. 15, 1916.
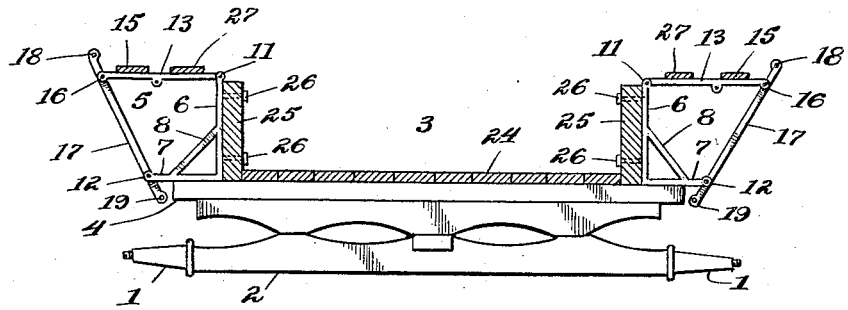
Fig. 1
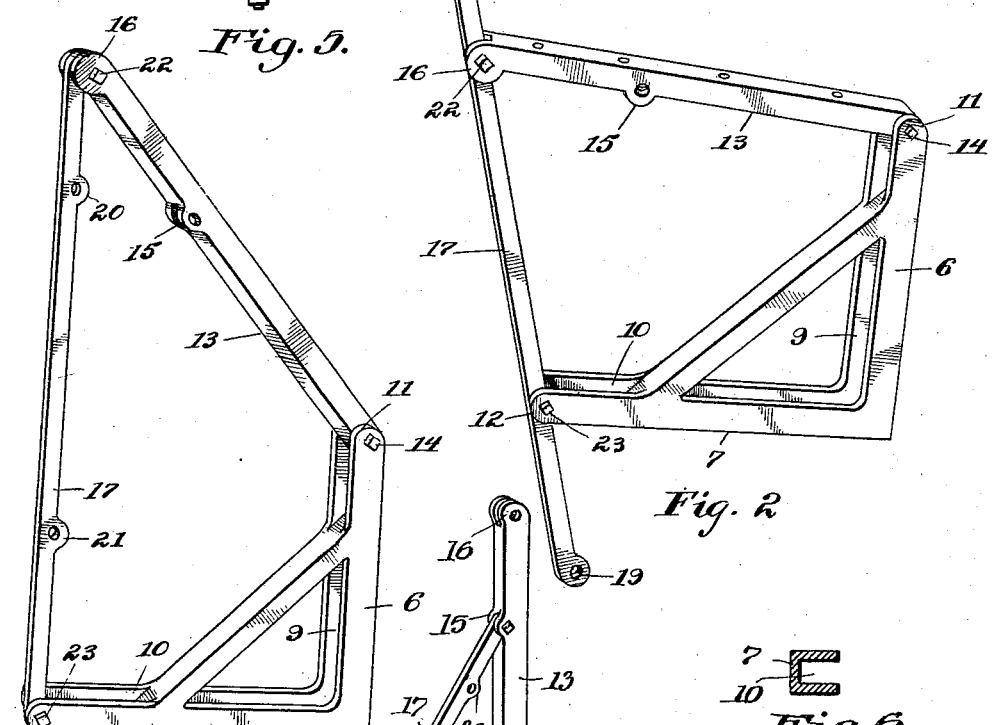
Inventor
Frank Woodard,
William J. Kamp,
By Victor J. Evans
Attorney

UNITED STATES PATENT OFFICE.

FRANK WOODARD AND WILLIAM J. KAMP, OF GOLDEN EAGLE, ILLINOIS.

WAGON-RACK BRACKET.

1,171,684.  Specification of Letters Patent.  Patented Feb. 15, 1916.

Application filed February 24, 1915. Serial No. 10,305.

*To all whom it may concern:*

Be it known that we, FRANK WOODARD and WILLIAM J. KAMP, citizens of the United States, residing at Golden Eagle, in the county of Calhoun and State of Illinois, have invented new and useful Improvements in Wagon-Rack Brackets, of which the following is a specification.

This invention relates to improvements in wagon racks and especially with reference to the provision of brackets of improved and novel construction by means of which a wagon rack may be constructed, that may be used as a hay rack and also as a barrel rack and as a hog or other animal rack or wagon box, thus enabling a rack to be produced which may be used as an all-purpose rack and which may be readily arranged in any desired adjusted position.

The invention consists in the construction, combination and arrangement of devices hereinafter described and claimed.

In the accompanying drawings:—Figure 1 is a vertical transverse sectional view of a wagon rack constructed in accordance with our invention and embodying in its construction adjustable brackets. Fig. 2 is a detail perspective view of one of the brackets arranged for use in connection with a hay rack. Fig. 3 is a similar view of the same adjusted to the required position for use in connection with a straw or barrel rack. Fig. 4 is a similar view to Fig. 3 showing the same arranged in the required position for a hog or animal rack or wagon box. Figs. 5 and 6 are detailed section views on the lines *a—a* and *b—b* of Fig. 4.

Referring especially to Fig. 1 of the drawing an axle is indicated at 1, a bolster at 2 and an all-purpose wagon bed or rack embodying our invention is indicated at 3.

In the construction of our improved all-purpose wagon rack or bed we provide cross bars 4 of suitable length and dimensions one of which is secured on the underneath side of the side planks 25 at a point behind the rear bolster. The length of the cross bars exceeds that of the bolsters so that the ends of the cross bars project beyond those of the bolsters and in accordance with our invention we provide brackets 5 which are arranged on the projecting ends of the cross bars. Each bracket comprises a vertical arm 6, a horizontal lower arm or base 7 and an inclined brace 8 which is arranged in the angle between the said arms. In practice the parts 6—7—8 of the bracket are integral and made in the form of a casting and as here shown the arm 6 is formed with a channel 9 in its outer side and the arm 7 is formed with a channel 10 in its upper side. This however is optional. The upper end of the arm 6 is bifurcated and formed with a pair of spaced lugs 11. The outer end of the arm 7 is similarly constructed and formed with a pair of spaced lugs 12. An adjustable arm 13 is also provided, the inner end of which is pivotally mounted between the lugs 11 and on a bolt 14 which we call a hinge bolt and which passes through registering openings in said end of the adjustable arm and in the lugs 11. Near its center the said adjustable arm is provided on its lower side, with spaced lugs 15 which have bolt receiving openings and at the outer end of said adjustable arm are similar spaced lugs 16 which have bolt receiving openings. Each bracket also embodies an adjustable brace 17 which is here shown as a bar of suitable length having its ends rounded as at 18—19 and provided with bolt openings, the said adjustable brace being also provided at intermediate points with lugs 20—21, each of which has a bolt opening. A bolt 22 is provided by means of which said adjustable brace may be connected pivotally to the outer end of the arm 13 of the bracket either at the point 18 or the point 20. A similar bolt 23 is provided by means of which said adjustable brace may be connected to the arm 7 either at the point 19 or 21. Hence the adjustable arm may be arranged and secured either in substantially horizontal position, or in inclined position, at an angle of 45°, or in a vertical position according to the purpose for which the wagon rack or bed is to be used.

The wagon rack or bed is also provided with bottom boards 24 which are secured on the cross bars 4 and with side planks 25 which are secured by bolts 26 to the inner side of the vertical arm 6 of the brackets. Boards 27, which are here shown as in spaced relation, are secured by bolts on the upper side of the adjustable bracket arms 13. When said bracket arms are arranged in substantially horizontal position, as shown in Figs. 1 and 2, the rack is for use as a hay rack. When the bracket arms 13 are in the inclined position shown in Fig. 3 the rack will be especially adapted for use as a straw or barrel rack for carrying empty barrels or the like. When the brackets are arranged with their arms 13 in vertical position as shown in Fig. 4 the bed or rack is arranged for use as a hog or animal rack or for any purpose for which a wagon box or bed may be needed.

It will be understood from the foregoing description that by means of our improved brackets a wagon rack may be constructed which may be speedily adjusted and arranged for any purpose.

It will be observed that the upper portion of our improved rack is entirely unobstructed thereby having no cross bars, cross rods or the like, therein, thus greatly facilitating the loading and unloading of the wagon rack or bed and greatly increasing the usefulness and utility thereof.

Having thus described our invention, we claim:—

1. A wagon rack bracket comprising a lower horizontal arm, a vertical arm at the inner end of said arm and an adjustable arm pivotally connected to the upper end of the vertical arm, an adjustable brace, means to pivotally connect said brace either at its lower end or at an intermediate point to the outer end of the lower arm, and means pivotally connecting the said brace either at its upper end to an intermediate point of said adjustable arm or connecting an intermediate point of said brace to the outer end of said adjustable arm so that said adjustable arm may be arranged either in a substantially horizontal inclined or vertical position.

2. A wagon rack bracket comprising a lower horizontal arm, a vertical arm at the inner end of said arm and an adjustable arm pivotally connected to the upper end of the vertical arm, an adjustable upright brace having a pair of apertures arranged adjacent its upper extremity, and a pair of apertures adjacent its lower extremity, a bolt adapted to pass through the apertures of the upper extremity of said brace and an end or an intermediate portion of said adjustable arm, and a second bolt adapted to pass through the apertures of the lower extremity of said brace and into the outer end of the lower horizontal arm.

In testimony whereof we affix our signatures in presence of two witnesses.

FRANK WOODARD.
WILLIAM J. KAMP.

Witnesses:
AUGUST HALTE,
W. C. ZIGRANG.

Copies of this patent may be obtained for five cents each, by addressing the "Commissioner of Patents, Washington, D. C."